US010071332B2

(12) United States Patent
Wall et al.

(10) Patent No.: US 10,071,332 B2
(45) Date of Patent: Sep. 11, 2018

(54) FILTER INSERT (71) Applicant: GE Jenbacher GmbH & Co OG, Jenbach (AT)

(72) Inventors: Guenther Wall, Bad Haering (AT); Thomas Trenkwalder, Tirol (AT)

(73) Assignee: GE Jenbacher GmbH & Co. OG, Jenbach (AT)

( * ) Notice: Subject to any disclaimer, the term of this patent is extended or adjusted under 35 U.S.C. 154(b) by 213 days.

(21) Appl. No.: 14/843,241

(22) Filed: Sep. 2, 2015

(65) Prior Publication Data
US 2016/0074799 A1    Mar. 17, 2016

(30) Foreign Application Priority Data

Sep. 15, 2014  (AT) .............. A 50644/2014

(51) Int. Cl.
*B01D 46/24* (2006.01)
*B01D 46/00* (2006.01)
*F01M 13/04* (2006.01)

(52) U.S. Cl.
CPC ........ *B01D 46/2411* (2013.01); *B01D 46/003* (2013.01); *B01D 46/0023* (2013.01); *B01D 46/0031* (2013.01); *F01M 13/04* (2013.01); *B01D 2275/10* (2013.01); *F01M 2013/0438* (2013.01)

(58) Field of Classification Search
CPC ............ B01D 46/2411; B01D 46/0031; B01D 46/003; B01D 46/0023; B01D 2275/10; F01M 13/04; F01M 2013/0438
See application file for complete search history.

(56) References Cited

U.S. PATENT DOCUMENTS

| | | | |
|---|---|---|---|
| 1,838,512 A * | 12/1931 | Wilson | F02M 35/026 95/214 |
| 3,890,123 A * | 6/1975 | Kuga | B01D 39/1623 210/315 |
| 4,050,237 A | 9/1977 | Pall et al. | |
| 4,053,290 A | 10/1977 | Chen et al. | |
| 4,160,684 A | 7/1979 | Berger, Jr. et al. | |
| 4,516,994 A | 5/1985 | Kocher | |

(Continued)

FOREIGN PATENT DOCUMENTS

| AT | 512 506 | 9/2013 |
|---|---|---|
| CN | 102202755 | 9/2011 |

(Continued)

OTHER PUBLICATIONS

Austrian Search Report dated Oct. 3, 2015 in corresponding Austrian Patent Application No. 50644/2014 (with English translation).

(Continued)

*Primary Examiner* — Amber R Orlando
*Assistant Examiner* — Brit E Anbacht
(74) *Attorney, Agent, or Firm* — GE Global Patent Operation; Rita D. Vacca (57) ABSTRACT

A filter insert is useful for the separation of liquid droplets from a gas flow, particularly a gas flow from an internal combustion engine. The filter insert includes a media packet with layered portions of filter media. The media packet includes at least one layer of filter media with capillary effect to close the media packet to gas passage.

13 Claims, 6 Drawing Sheets

(56) References Cited

U.S. PATENT DOCUMENTS

| | | | |
|---|---|---|---|
| 4,627,406 A | 12/1986 | Namiki et al. | |
| 4,818,257 A * | 4/1989 | Kennedy | B01D 39/2017 422/161 |
| 5,242,475 A | 9/1993 | Stine et al. | |
| 5,961,678 A * | 10/1999 | Pruette | B01D 46/0005 210/448 |
| 6,419,721 B1 | 7/2002 | Hunter | |
| 8,449,637 B2 | 5/2013 | Heinen et al. | |
| 8,499,749 B2 | 8/2013 | Mosset et al. | |
| 8,747,503 B2 | 6/2014 | Tornblom et al. | |
| 2004/0040272 A1 | 3/2004 | Uhlenbrock | |
| 2006/0207943 A1 * | 9/2006 | Schlensker | B01D 17/0202 210/689 |
| 2009/0211544 A1 | 8/2009 | Frazier, Jr. et al. | |
| 2010/0031940 A1 | 2/2010 | Mosset et al. | |
| 2010/0229510 A1 | 9/2010 | Heinen et al. | |

FOREIGN PATENT DOCUMENTS

| | | |
|---|---|---|
| CN | 102317585 | 1/2012 |
| CN | 102470378 A | 5/2012 |
| DE | 19801608 A1 | 7/1999 |
| DE | 102 39 408 | 3/2004 |
| DE | 699 09 284 | 6/2004 |
| DE | 20 2005 004 151 | 8/2006 |
| DE | 10 2013 111 149 | 4/2014 |
| JP | 61-107916 | 5/1986 |
| JP | 05245321 A | 9/1993 |
| JP | 6-34722 | 5/1994 |
| JP | 11230074 A | 8/1999 |
| JP | 2004160328 A | 6/2004 |
| JP | 2004211670 A | 7/2004 |

OTHER PUBLICATIONS

Unofficial English Translation of Japanese Search Report issued in connection with corresponding JP Application No. 2015167512 dated Dec. 13, 2016.

European Search Report dated Mar. 2, 2016 in corresponding European Patent Application No. 15002505 (with English translation).

English Translation of the Search Report dated Nov. 30, 2016 in corresponding Chinese Application No. 201510586406.7.

Unofficial English Translation of Korean Notice of Allowance issued in connection with corresponding KR Application No. 10-2015-0129977 dated May 2, 2017.

* cited by examiner

Fig. 5

FILTER INSERT

TECHNICAL FIELD

The invention concerns a filter insert for the separation of liquid particles from a gas flow, a filter device having such a filter insert and an internal combustion engine having same.

BACKGROUND

A function which is frequently required in technology is the separation of liquid droplets from a gas flow.

The separation devices used for that purpose are frequently so designed that a mostly cylindrical filter insert (a filter cartridge) is fitted in a housing, with the gas flow to be cleaned flowing radially through the filter insert. In that case the flow through the filter insert can be from the peripheral surface inwardly or vice-versa. A typical filter insert includes a media packet (a packet of filter media) which is fixed by securing portions to the cover surfaces.

The filter media used in a filter insert have to perform two main functions:
- separation of the entrained liquid by various filter mechanisms, predominantly depth filtration and coalescence, and
- continuous discharge of liquid from the filter medium to maintain a low level of saturation of the filter medium and thus a low counterpressure in the filter.

The usual filter design involves a structure having one or more different filter media, with suitable media properties like fiber diameter, porosity and surface energy. In general coarse separation is disposed upstream of fine separation in the flow direction.

The design of a filter is implemented having regard to the demands in terms of degree of separation, liquid drainage and acceptable counterpressure.

Filter media for fine separation are required in particular for high degrees of separation. Typically the filter media for fine separation are characterised by a small fiber diameter and small pore size.

A disadvantage there is that absorbed liquid, for example oil, is not adequately transported out of the filter medium for fine separation, under usual operating conditions, whereby this involves a high flow resistance in operation.

In order to minimize saturation of the filter media with separated liquid there are endeavors to improve drainage from the filter media (media for coarse separation and for fine separation), in the direction of the gas flow.

AT 512506 B1 shows a filter device for separating droplets from gaseous material flow, wherein at an entry surface of a filter layer a flow barrier is formed, which partly covers the area of the entry surface adjacent to a drainage layer and wherein the flow barrier substantially completely covers the entry face of the drainage layer.

DE 202005004151 U1 describes a filter element, at which a collected liquid can flow over a bottom edge of a spacer fabric through gravitation and can be collected afterwards.

DE 69909284 T2 describes improvements at a coalescence filter. According to the document, the filter comprises a first oil coalescence layer made of a micro fiber material, and a second layer from an oil drainage material, wherein a drainage layer serves to accommodate oil from the coalescence layer and offers a path to the oil to flow out of the filter by gravitation.

US 2010/031940 A1 shows a filter device for filtering blow-by gas, with axial drainage and sealing.

U.S. Pat. No. 8,499,749 B2 discloses a filter for a blow-by gas of a crankcase venting system, in which drainage holes for the separated liquid are provided in the bottom portion of the filter insert. It will be noted however that the disadvantage of this solution that inevitably there is a bypass of gas through the drainage openings. Bypass means here that gas can escape through the drainage openings and thus does not pass through all filter layer portions.

SUMMARY OF THE DISCLOSURE

Therefore the object of the present invention is to provide a filter insert which has good liquid drainage without suffering from the disadvantages of the state of the art. The invention also seeks to provide a filter device using such a filter insert, as well as an internal combustion engine having such a filter.

That object is attained by a filter insert and by a filter device, as well as an internal combustion engine. Preferred embodiments are recited in the appendant claims.

The fact that a passage for the liquid, that extends over the radius of the filter insert, is provided between the filter medium for fine separation of the media packet and the bottom of the filter insert, or within the media packet, therefore provides that the drained liquid can easily pass out of the filter insert. The word passage means that there is provided a flow path which is substantially or completely free from filter media. As a result the liquid can flow away substantially more easily and thus does not lead to the above-discussed problems with saturation of the filter media and the linked increased flow resistance of the filter insert.

The expression "extending over the radius" is related to the generally cylindrical basic shape of the filter insert. In the context of this application it is to be interpreted as meaning that the passage has a continuous flow path in the direction of the prevailing liquid discharge flow direction. It will be appreciated that the invention can also be applied to shapes other than a cylindrical shape. The passage can certainly also have tangential directional components. The passage can be in the form of a cylindrical gap or in the form of individual passages.

It can preferably be provided that the media packet includes at least one fine filter.

It can further preferably be provided that the passage is substantially or completely free from fine filter as the fine filters which are indispensable for fine separation oppose a particularly high flow resistance to the liquid to be drained.

It can preferably be provided that the media packet has at least one layer with a capillary effect.

The particular advantage of the presence of a layer with a capillary effect is that after saturation with liquid it is gas-tight but transmissive for liquid (open to liquid). Accordingly the media packet is substantially gas-tightly closed in those regions which are saturated by the capillary effect of liquid. Materials which can be wetted in relation to the liquid, for example oil, are selected for filter media with a capillary effect. The selection depends on the surface tension or interface tension of the liquid in relation to the filter medium.

It has been found to be particularly desirable if the filter medium with capillary effect is so adapted that the liquid reaches therein a rise height of between 2 and 10 cm, preferably between 2 and 5 cm. The rise height can be easily determined by experiment. In the wetted condition filter media with a capillary effect form a layer which is open to liquid, that is to say liquid, for example oil, can flow therethrough, but which is substantially gas-tight under usual operating conditions (for example between 20 mbar and 50 mbar filter difference pressure).

It is preferably provided that the layer with a capillary effect is such that it portion-wise gas-tightly closes the media packet, preferably on the afflux flow side and the discharge flow side of the gas. In operation the layer with a capillary effect, by virtue of the capillary effect, sucks up liquid out of the liquid which collects at the bottom, whereby the layer becomes gas-tight up to the rise height.

That therefore provides that the media packet is substantially gas-tightly closed up to a given height for the usual operational differential pressures (up to about 50 mbar, preferably up to 20 mbar). No gas can be urged out of the media packet through the gas-tight portion, through the above-described passage, without that gas flowing through the layers of the media packet, that are provided for filtering purposes.

The effect can be compared to a siphon which passes the liquid which is being discharged but which deflects the gas through the regions of the media packet, that are not saturated with the liquid.

The invention makes use of the realization that a layer which is gas-tight but transmissive for liquid (open to liquid) is produced by saturation of given filter media with liquid. Liquid can still be transported away through that layer.

It will be noted however that filter media for fine separation (fine filter) oppose a very high flow resistance to the liquid as it flows away, upon saturation with liquid. It is therefore preferably provided that a fine filter which is possibly arranged in the media packet does not extend over the entire length of the filter device, in other words the filter portion for fine separation is shorter than the other filter media in the media packet. The reference to the length of the filter device means that extent which is normal to the main through-flow direction of the gas flow.

Accordingly there is a passage within the media packet, which is free from filter media for fine separation. The passage provides that the filter medium for fine separation remains substantially unaffected by the level of liquid which occurs in operation.

That is of importance for the reason that the filter medium for fine separation involves a particularly high flow resistance, in the condition of being saturated with liquid.

It can preferably be provided that the layer with the capillary effect is in the form of a drainage material or a separation medium.

It can also be provided that the filter portion for fine separation extends in operation into the level of liquid which is produced. The filter medium with capillary effect serves here as a gas barrier and prevents a flow through the intermediate space between the filter medium for fine separation and the adhesive.

The height of the passage is preferably in a range no greater than between 2 and 0.5% of the height of the filter insert. That achieves a particularly good compromise as between drainage action and separation effect.

For common filter dimensions, especially for filter inserts for oil mist separation in the case of stationary engines, the passage is particularly preferably of a height of between 5 mm and 20 mm.

It can preferably be provided that a plurality of layer portions of filter medium with capillary effect are arranged within the media packet, in particular within the arrangement of filter medium for fine separation, both before and after the arrangement of filter medium for fine separation, in the gas flow direction. In other words layer portions with capillary effect are disposed both within the portion for fine separation and also upstream and downstream thereof. Accordingly the portion for fine separation is preferably "packed in" by layers with a capillary effect.

The filter insert can be of different forms: for example a cylindrical geometry is appropriate. In this case the layer portions of filter medium are typically wound but can also be layered. The filter layer portions are layered in the case of a cuboidal configuration. The discussion set forth hereinbefore relating to cylindrical geometries in respect of the orientation of the passage also correspondingly applies to other structural shapes. What was denoted by "radial" for a cylindrical geometry is to be notionally replaced for a cuboidal shape by "in the flow direction".

The described filter insert is particularly suited for the separation and discharge of oil droplets from a gas charged with oil mist, for example a blow-by gas of a crankcase venting system of an internal combustion engine. For that purpose the filter insert is typically replaceably installed in a filter device.

BRIEF DESCRIPTION OF THE DRAWINGS

The invention is described in greater detail hereinafter with reference to the drawings in which.

DETAILED DESCRIPTION

Figure 1:
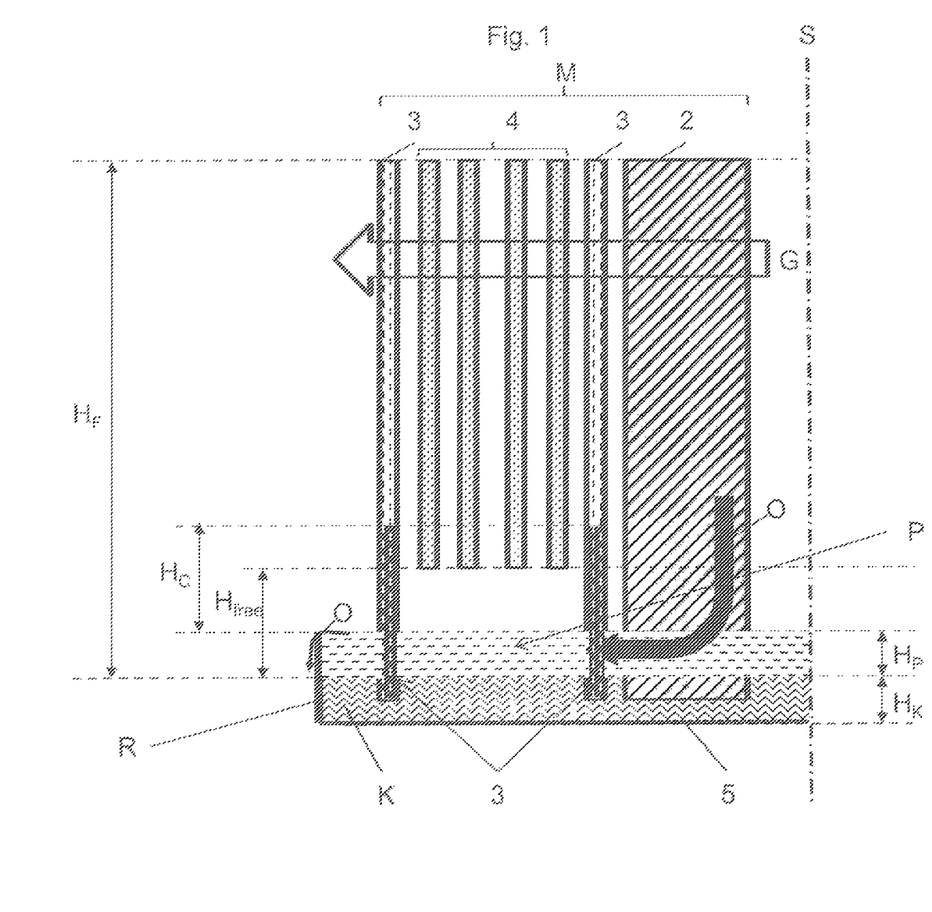
FIG. 1 shows a diagrammatic cross-sectional view of a filter insert.

FIG. 1 shows an embodiment for a filter insert 1 for the separation of liquid suspended particles from a gas flow G, in particular for the separation of liquid droplets from an aerosol-carrying gas. The filter insert 1 in FIG. 1 is of a cylindrical configuration. The symmetry is identified by the axis of symmetry S. Therefore only the left-hand half of the rotationally symmetrical structure is shown in the cross-sectional view.

It is possible to see in the arrangement layers involving different filter media which together provide the media packet M. The filter insert 1 is of the height $H_F$.

The gas or the gas flow G firstly flows through the filter medium in order then to flow through the fine filter 4 by way of a first filter layer with capillary effect 3. Once again arranged outwardly of the arrangement in the flow direction is a layer with a capillary effect 3, through which the now cleaned gas flow leaves the filter insert 1.

The gas flow G flows centrally from above into the filter insert 1. The incoming gas flow G is firstly freed of larger liquid droplets in the filter medium 2. Subsequently fine separation takes place in the fine filter 4. The gas flow G leaves the filter insert 1 after passing through the last filter layer.

It will be appreciated that in operation the filter insert 1 is surrounded by a housing which allows the gas flow G to pass centrally and preferably from above into the filter insert 1 and at the underside it has an oil discharge. The housing is not shown for the sake of clarity of the drawing. The man skilled in the art is fully conversant with the design configuration of such a housing which allows insertion and replacement of a filter insert 1.

For the sake of clarity the individual layers of the media packet M are shown spaced. In reality they are densely packed, for example wound. Thus it will also be appreciated that there is no bypass for the gas flow G through the portion which is free of the fine filter 4 (this is the length $H_{free}$ minus $H_P$). Rather the gas flow G passes through the fine filter 4.

It has proven to be essential in terms of function that there is provided at least one filter layer with capillary effect 3 before and after the passage P.

The liquid O flows under the force of gravity in or on the media packet M in the direction of the bottom 5 of the filter insert 1 and flows away over the edge R (indicated by an arrow at the edge R). The quantitatively largest portion of liquid separation occurs in that respect at the surface, which is first encountered by the gas flow, of the media packet M, being formed here by a filter medium for liquid separation 2, preferably a coarse filter.

The filter media 2, 3 and 4 which in this embodiment are in the shape of cylindrical rings are joined to the bottom 5 by an adhesive layer K of the height $H_K$. The bottom 5 is generally in the form of a deep-drawn plate, with an edge R. In operation the liquid O collects at the bottom 5, therefore producing a liquid level. The height of edge R predetermines the height that the liquid level attains in the filter insert in operation. In this embodiment liquid O flows away radially from the filter insert. The height of the edge R therefore predetermines the height of the level of liquid under steady operating conditions.

In the embodiment of FIG. 1 the height of the edge R is so selected that in operation the fine filter does not project into the liquid level, being therefore spaced therefrom.

In operation of the filter insert 1 there is therefore a passage P of the height Hp, which allows a discharge flow of liquid which is markedly improved over the state of the art as the separated liquid does not have to flow through the fine filter 4.

The filter medium with capillary effect 3 provides that the passage P is gas-tightly closed downstream of the fine filter 4. In that way no gas of the gas flow G can leave the filter insert 1 without firstly having passed through the fine filter 4. The height $H_C$ denotes that length, over which the filter media with capillary effect 3 are saturated with liquid and are thereby gas-tight. As discussed hereinbefore in the description $H_C$ is the rise height of the liquid due to the capillary effect in the medium 3.

The height $H_{free}$ denotes that height which occurs between the adhesive layer K and the fine filter 4.

Figure 2:
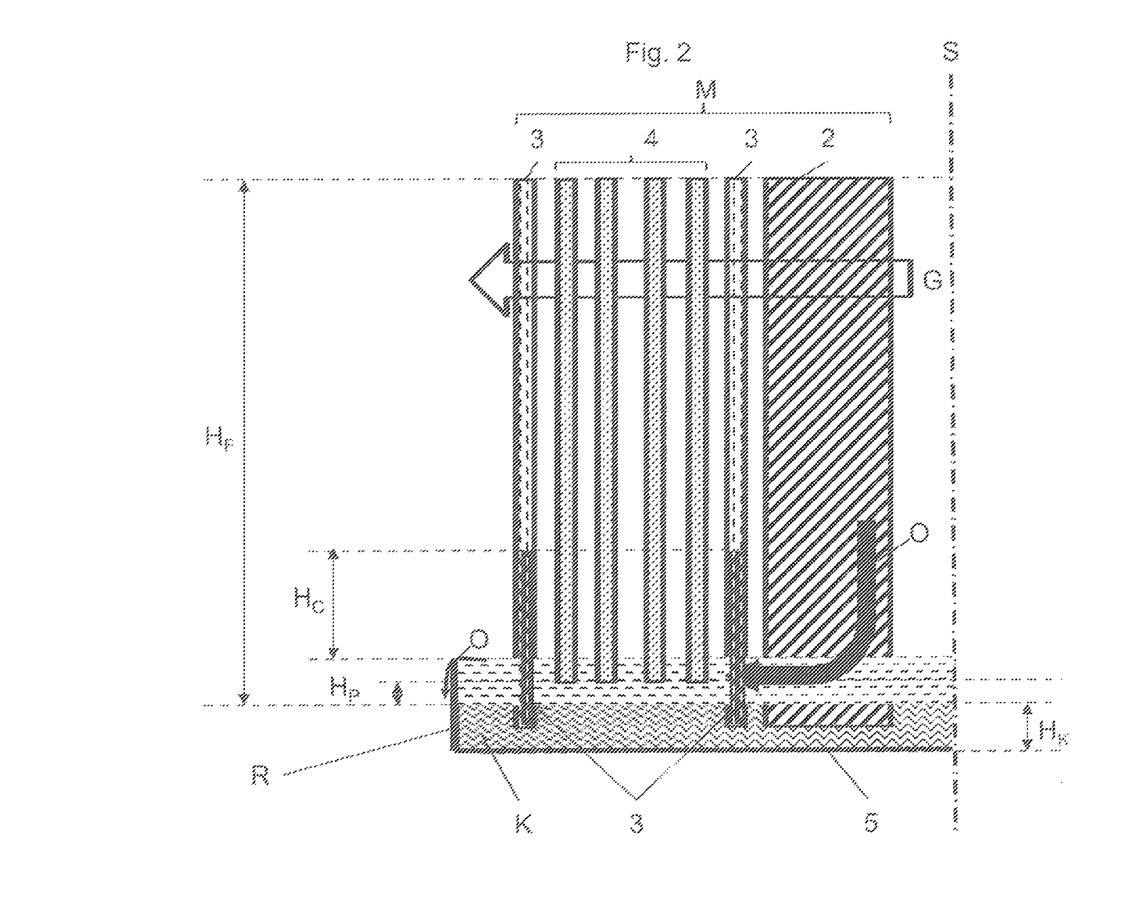
FIG. 2 shows a diagrammatic cross-sectional view of a filter insert in an alternative embodiment.

In the embodiment of FIG. 2 the edge R of the bottom B or the length of the fine filter 4 is such that in operation of the filter insert 1 the fine filter 4 extends into the liquid level. The height of the liquid level is predetermined by the height of the edge R.

The height of the passage $H_P$ is then reduced by the depth of immersion of the fine filter 4 into the liquid level, in comparison with the FIG. 1 embodiment.

Figure 3:
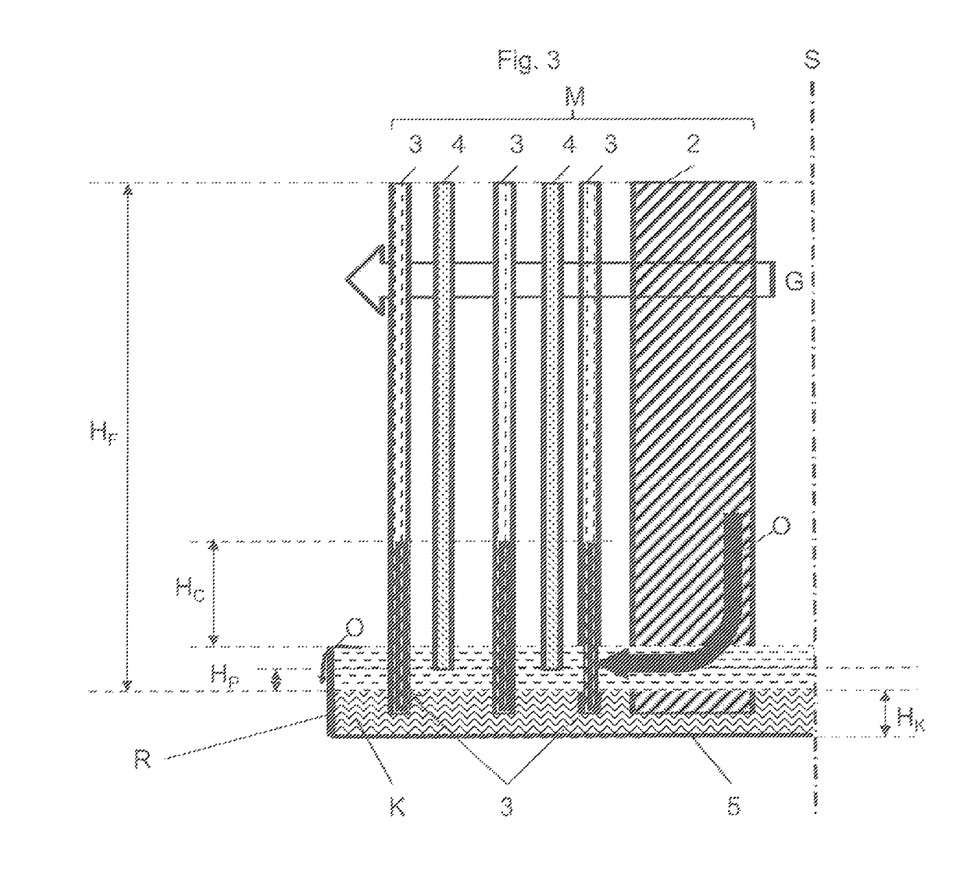
FIG. 3 shows a diagrammatic cross-sectional view of a filter insert in a further alternative embodiment.

In the embodiment shown in FIG. 3 a further layer portion of filter medium with capillary effect 3 is provided within the layer portions of the fine filter 4. As a result the gas flow is also deflected within the media packet—by the gas-tight barrier of the saturated portion of the filter medium with capillary effect 3—and has to pass through the fine filter 4. It will be appreciated that this can be repeated, that is say a plurality of layer portions of filter medium with capillary effect can be provided within the media packet.

The Figures show at least one respective fine filter 4 in the media packet M. The invention is not limited to the media packet M having a filter medium 4 for fine separation and the passage P being formed by a fine filter-free portion. Rather, it can be provided that a passage P is implemented within the media packet M, for example by means of apertures or passages within the media packet M. Those apertures or passages are then preferably embodied in the lower region of the media packet M.

The Figures show only one respective sequence of filter medium 4 for fine separation and filter medium with capillary effect 3. It will be appreciated that the arrangement can be repeated. Therefore it is possible to provide a plurality of sequences of fine filters 4 and filter layers with capillary effect 3.

It can also be provided that the passage P is not afforded over the entire angular range of 360°, but only in segments thereof.

In practice the passage P can also produced in such a way that the adhesive layer K at the bottom 5 is provided in preferably concentric annular beads. That provides that there is no join between the respective filter medium and the bottom 5 with the adhesive beads so that a passage P is implemented thereby.

Figure 4:
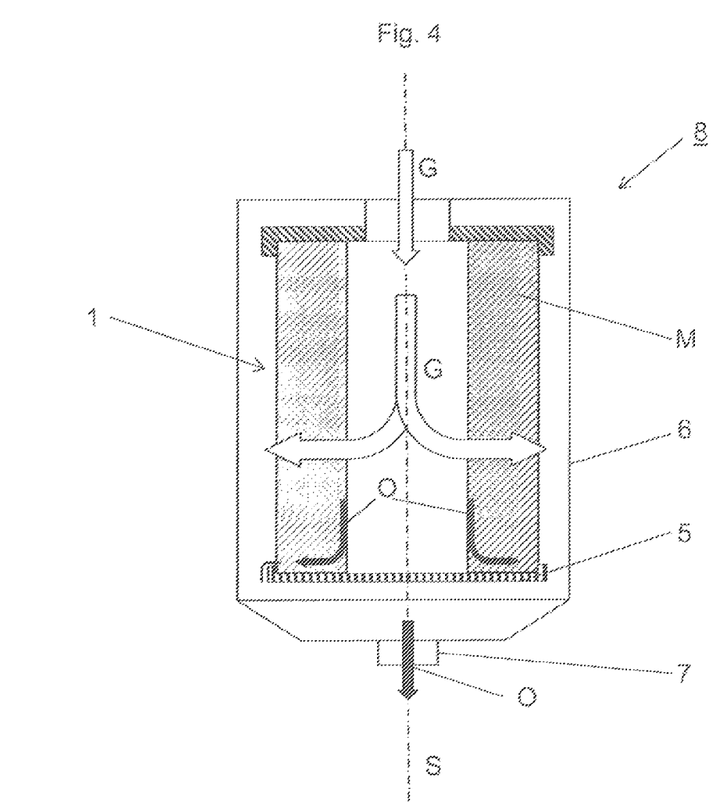
FIG. 4 shows a diagrammatic view of a filter insert.

FIG. 4 shows a filter device 8 in which a filter insert 1 is arranged. In the structure shown here the gas G flows centrally from above into the filter device 8 and flows through the filter insert 1 from the inside outwardly. The liquid O is separated at the media packet M and flows downwardly under the force of gravity. It flows in a radial direction outwardly over the bottom 5 and leaves the housing 6 by way of a liquid discharge 7.

Figure 5:
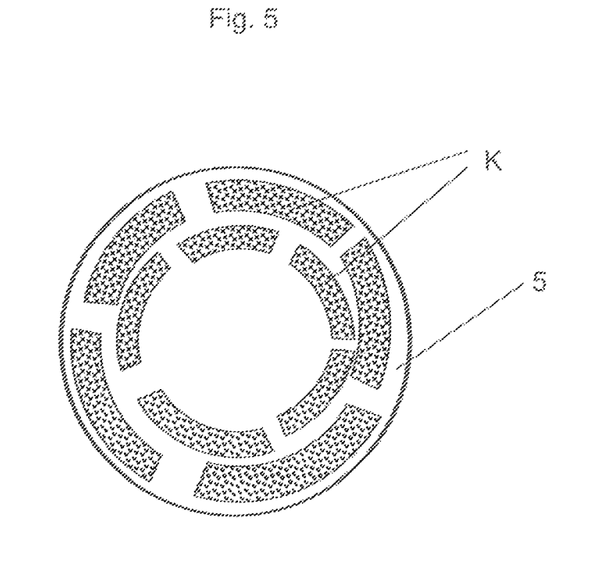
FIG. 5 shows the bottom of a filter insert.

FIG. 5 shows a diagrammatic plan view illustrating the bottom 5 of a filter insert 1, in which case in this embodiment the adhesive layer K is applied in the form of beads which are not peripherally closed so that the media packet M (not shown here) is not joined to the bottom 5 over the entire surface area thereof. In this way also it is possible to provide a passage P for the discharge flow of liquid O.

Figure 6:
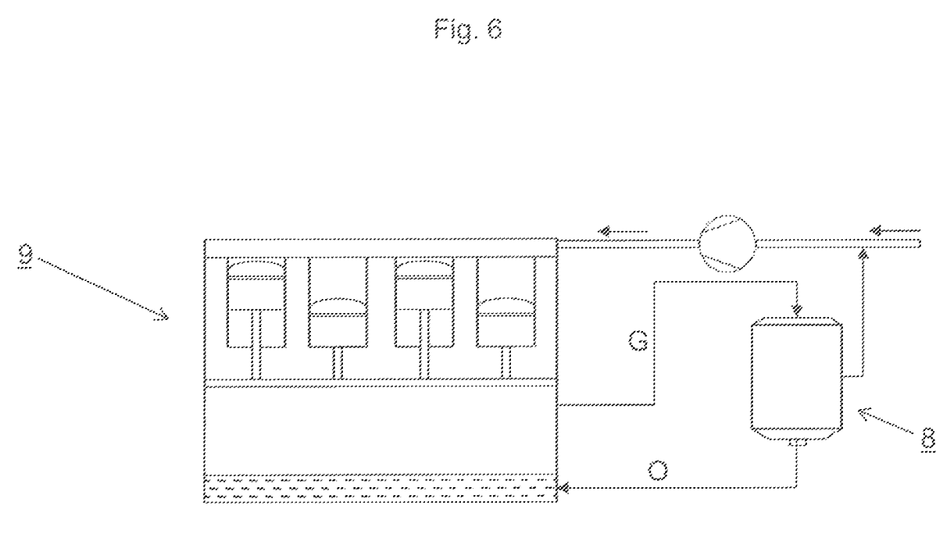
FIG. 6 shows an internal combustion engine with filter device.

FIG. 6 shows an internal combustion engine 9 having a filter device 8. The man skilled in the art is conversant with the circuitry interconnection of a filter device 8 for separating liquid O out of the gas G and same does not need to be described more fully at this juncture.

LIST OF REFERENCES USED 1 filter insert
2 filter medium for liquid separation
3 filter medium with capillary effect
4 filter medium for fine separation
5 bottom
6 housing
7 oil discharge
8 filter device
9 internal combustion engine
G gas, gas flow
K adhesive layer
O liquid
P passage
R edge
S axis of symmetry

The invention claimed is:
1. A filter insert for separation of liquid droplets from a gas flow comprising:

a media packet comprising layer portions of filter media, with the media packet arranged for the gas flow through the media packet;

a bottom arranged in a lower region of the filter insert to collect the liquid droplets as a collected liquid separated from the gas flow;

a passage for the collected liquid, extending over a radius of the filter insert, arranged between a filter medium for fine separation and the bottom, or within the media packet; and at least one layer of filter medium in the media packet with a capillary effect to gas-tightly closes the media packet on a discharge flow side, by the capillary effect.

2. The filter insert as set forth in claim 1, wherein the media packet includes at least one layer of the filter medium for fine separation as a fine filter and at least one layer of filter medium for course separation.

3. The filter insert as set forth in claim 1, wherein the passage is partially or completely free from the filter medium for fine separation.

4. The filter insert as set forth in claim 3, wherein the filter medium with the capillary effect has a rise height with respect to the capillary effect of between 2 and 10 cm.

5. The filter insert as set forth in claim 1, wherein a plurality of layer portions of the filter medium with the capillary effect are arranged within the media packet, and arranged before and after the filter medium for fine separation in a flow direction of the gas flow.

6. The filter insert as set forth in claim 1, wherein the passage is of a height between 0.5% and 2% that of a height of the filter insert.

7. The filter insert as set forth in claim 1, wherein the passage is of a height between 5 mm and 20 mm.

8. The filter insert as set forth in claim 1, wherein the filter insert is of a cylindrical shape and the media packet comprises wound layer portions of filter media.

9. The filter insert as set forth in claim 1, wherein the filter insert is of a cuboidal basic shape and the media packet comprises layered layer portions of filter media.

10. A filter device having the filter insert as set forth in claim 1.

11. A filter device having the filter insert as set forth in claim 1, wherein a height of the passage is less than a height of an edge less a height of an adhesive.

12. A filter device having the filter insert as set forth in claim 1, wherein the passage is provided by an arrangement of an adhesive, or a form of the bottom with depressions in a region of the filter medium for fine separation.

13. An internal combustion engine having the filter device as set forth in claim 10.

* * * * *